(12) United States Patent
Ugajin et al.

(10) Patent No.: US 9,141,327 B1
(45) Date of Patent: Sep. 22, 2015

(54) PACKET GENERATION DEVICE AND NON-TRANSITORY COMPUTER READABLE MEDIUM

(71) Applicant: FUJI XEROX CO., LTD., Tokyo (JP)

(72) Inventors: Atsushi Ugajin, Kanagawa (JP); Tomoya Ishizaki, Kanagawa (JP); Atsushi Kitagawara, Kanagawa (JP); Yoshinori Awata, Kanagawa (JP); Tsutomu Hamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/333,100

(22) Filed: Jul. 16, 2014

(30) Foreign Application Priority Data

Mar. 20, 2014 (JP) ................. 2014-057807

(51) Int. Cl.
*G06F 3/12* (2006.01)
*G06K 15/02* (2006.01)
(52) U.S. Cl.
CPC ............ *G06F 3/1293* (2013.01); *G06F 3/1298* (2013.01); *G06K 15/1836* (2013.01)
(58) Field of Classification Search
USPC ....................................... 358/1.15
See application file for complete search history.

(56) References Cited

U.S. PATENT DOCUMENTS

| 6,433,820 | B1* | 8/2002 | Koide et al. ............. 348/231.99 |
| 7,062,579 | B2* | 6/2006 | Tateyama et al. ............ 710/104 |
| 8,929,290 | B2* | 1/2015 | Lindner ........................ 370/328 |
| 9,055,353 | B2* | 6/2015 | Suzuki et al. ........................ 1/1 |
| 2006/0215703 | A1 | 9/2006 | Honda | |

FOREIGN PATENT DOCUMENTS

JP           B2-4207912           1/2009

\* cited by examiner

*Primary Examiner* — Allen H Nguyen
(74) *Attorney, Agent, or Firm* — Oliff PLC

(57) ABSTRACT

Provided is a packet generation device including a first generation unit that generates a packet having a b-byte payload including plural sets of first data corresponding to a pixels from the first data having m-bit image information for each pixel, and a second generation unit that generates a packet having a b-byte payload including plural sets of second data corresponding to a pixels from the second data having n-bit image information for each pixel (where m<n), wherein a is defined so that (n−m)×a becomes multiples of 8, and wherein b is defined based on a least common multiple of the number of bytes of sets of the first data corresponding to a pixels and the number of bytes of sets of the second data corresponding to a pixels.

3 Claims, 5 Drawing Sheets

PACKET GENERATION DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-057807 filed Mar. 20, 2014.

BACKGROUND

Technical Field

The present invention relates to a packet generation device and a non-transitory computer readable medium.

SUMMARY

According to an aspect of the invention, there is provided a packet generation device including:

a first generation unit that generates a packet having a b-byte payload including plural sets of first data corresponding to a pixels from the first data having m-bit image information for each pixel; and a second generation unit that generates a packet having a b-byte payload including plural sets of second data corresponding to a pixels from the second data having n-bit image information for each pixel (where m<n), wherein a is defined so that (n−m)×a becomes multiples of 8, and wherein b is defined based on a least common multiple of the number of bytes of sets of the first data corresponding to a pixels and the number of bytes of sets of the second data corresponding to a pixels.

BRIEF DESCRIPTION OF THE DRAWINGS

Exemplary embodiments of the invention will be described in detail based on the following figures, wherein.

DETAILED DESCRIPTION

An exemplary embodiment of the invention will be described.

Figure 1:
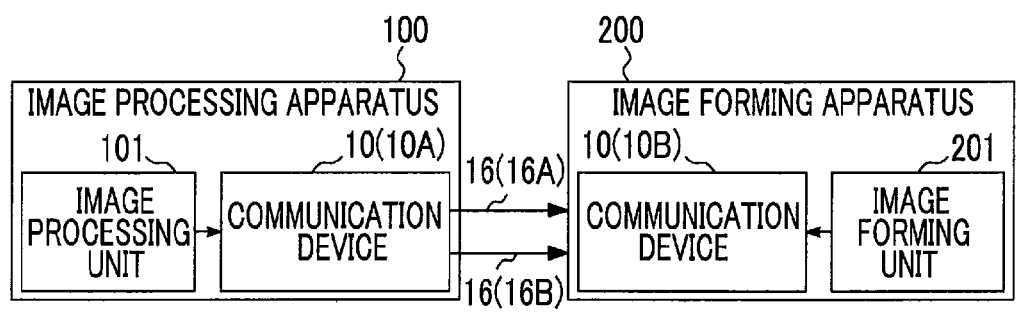
FIG. 1 is a diagram illustrating an entire configuration of an exemplary embodiment.

FIG. 1 is a diagram illustrating an entire configuration of the exemplary embodiment. An image processing apparatus 100 includes a communication device 10A, and an image forming apparatus 200 includes a communication device 10B. The communication device 10A and the communication device 10B have the same configuration. The communication device 10A and the communication device 10B are connected to each other via a transmission path 16. In the following description, in a case where the communication device 10A and the communication device 10B are not differentiated from each other, the communication device 10A and the communication device 10B are collectively referred to as a communication device 10.

The image processing apparatus 100 includes an image processing unit 101 which converts, for example, data which is described in a page description language into image information with a raster format and performs various image processes on the image information. The communication device 10A transmits the image information having undergone the image processes in the image processing unit 101, to the communication device 10B via the transmission path 16. The image forming apparatus 200 includes an image forming unit 201 which forms an image based on the image information received by the communication device 10B on a recording medium.

Figure 2:
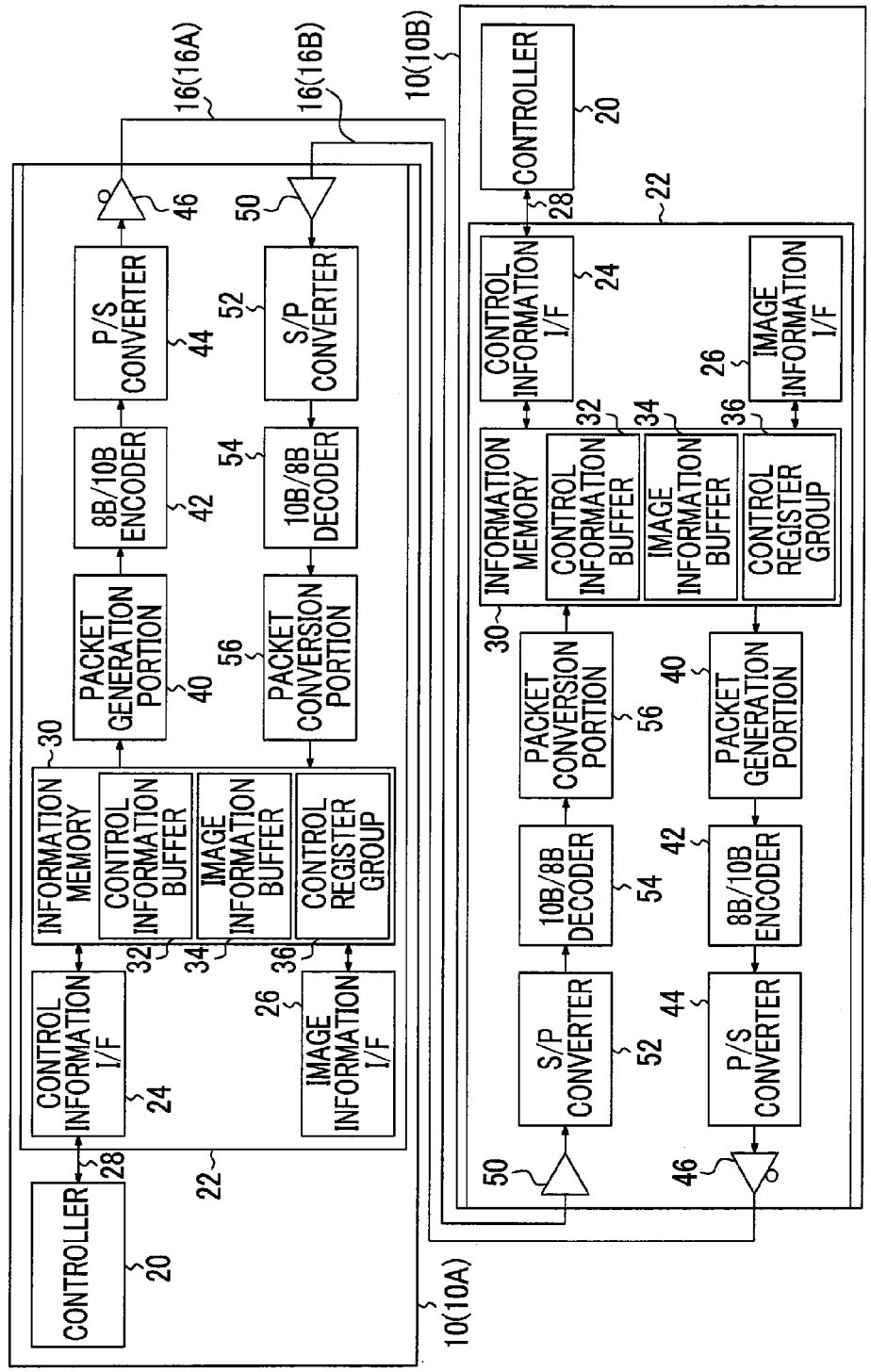
FIG. 2 is a diagram illustrating a hardware configuration of a communication device.

FIG. 2 is a diagram illustrating a hardware configuration of the communication device 10. The communication device 10 includes a controller 20 and a communication processing unit 22. The controller 20 includes a calculation unit such as a central processing unit (CPU), and a memory such as a read only memory (ROM) or a random access memory (RAM) (none illustrated). An operating system (OS) is stored in the ROM. The RAM is used to store information when the CPU performs calculation. The controller 20 outputs control information for controlling an operation of the communication device 10 to the communication processing unit 22.

The communication processing unit 22 includes a control information interface (I/F) 24, an image information I/F 26, an information memory 30, a packet generation portion 40, an 8B/10B encoder 42, a parallel/serial (P/S) converter 44, a transmission portion 46, a reception portion 50, an S/P converter 52, a 10B/8B decoder 54, and a packet conversion portion 56.

The control information I/F 24 is an interface which transmits and receives control information to and from the controller 20 and the information memory 30. The image information I/F 26 of the communication device 10A is an interface which transmits and receives image information to and from the image processing unit 101 and the information memory 30. The image information I/F 26 of the communication device 10B is an interface which transmits and receives image information to and from the information memory 30 and the image forming unit 201.

The information memory 30 includes a control information buffer 32, an image information buffer 34, and a control register group 36. Control information which is output from the controller 20 is written to the control information buffer 32 via the control information I/F 24. Image information which has undergone image processes by the image processing unit 101 is written to the image information buffer 34 of the communication device 10A via the image information I/F 26 of the communication device 10A. The image information written to the image information buffer 34 of the communication device 10A is output to the image forming unit 201 via the image information I/F 26 of the communication device 10B.

The control register group 36 is used to temporarily store a calculation result, to store addresses when reading or writing is performed on the control information buffer 32 or the image information buffer 34, to store an operation state of the communication processing unit 22, or the like.

The packet generation portion 40 is an example of a packet generation device related to the exemplary embodiment of the invention, and generates a packet based on the image information read from the image information buffer 34. The packet has an 84-byte (1 byte=8 bits) payload. The packet generation portion 40 outputs the generated packet to the 8B/10B encoder 42. Details of the packet generation portion 40 will be described later.

The 8B/10B encoder 42 coverts data included in the packet which is output from the packet generation portion 40, into 10-bit data every 8 bits from a leading part by using an 8B/10B coding method, and outputs the converted packet to the P/S converter 44. The P/S converter 44 outputs data of 1 bit sequentially from a leading part of the packet which is output from the 8B/10B encoder 42, to the transmission portion 46. The transmission portion 46 converts the data which is output from the P/S converter 44 into a differential signal which is sent to the transmission path 16. The transmission path 16 is a cable which serially transmits differential signals.

The reception portion 50 receives the differential signal which is transmitted from the transmission portion 46 via the transmission path 16, and converts the received differential signal into 1-bit data which is output to the S/P converter 52. The S/P converter 52 converts the data which is output from the reception portion 50, into a packet, and outputs the converted packet to the 10B/8B decoder 54. The 10B/8B decoder 54 inversely converts data included in the packet which is output from the S/P converter 52, into 8-bit data every 10 bits from a leading part by using an 8B/10B coding method, and outputs the inversely converted packet to the packet conversion portion 56.

The packet conversion portion 56 analyzes the packet which is output from the 10B/8B decoder 54 so as to convert the packet into image information, and writes the converted image information to the image information buffer 34. Details of the packet conversion portion 56 will be described later.

Next, the packet generation portion 40 will be described in detail. The packet generation portion 40 generates a packet in either a first mode or a second mode. The first mode is a mode in which image information with a resolution of 8 bits (image information in which a grayscale of a pixel is represented in binary numbers of 8 bits and which is hereinafter referred to as 8-bit data) is converted into a packet. The second mode is a mode in which image information with a resolution of 10 bits (image information in which a grayscale of a pixel is represented in binary numbers of 10 bits and which is hereinafter referred to as 10-bit data) is converted into a packet. The packet generation portion 40 determines whether the image information read from the image information buffer 34 is 8-bit data or 10-bit data, generates a packet in the first mode if the image information is 8-bit data, and generates a packet in the second mode if the image information is 10-bit data. Information indicating a resolution of the image information may be included in the image information, and information indicating a resolution of the image information may be transmitted from the controller 20 to the packet generation portion 40.

In both cases of the 8-bit data and the 10-bit data, 4-bit additional information is added to image information for each pixel. The additional information includes information or the like indicating the type of image information (for example, text, a picture, or the like).

Figure 3:
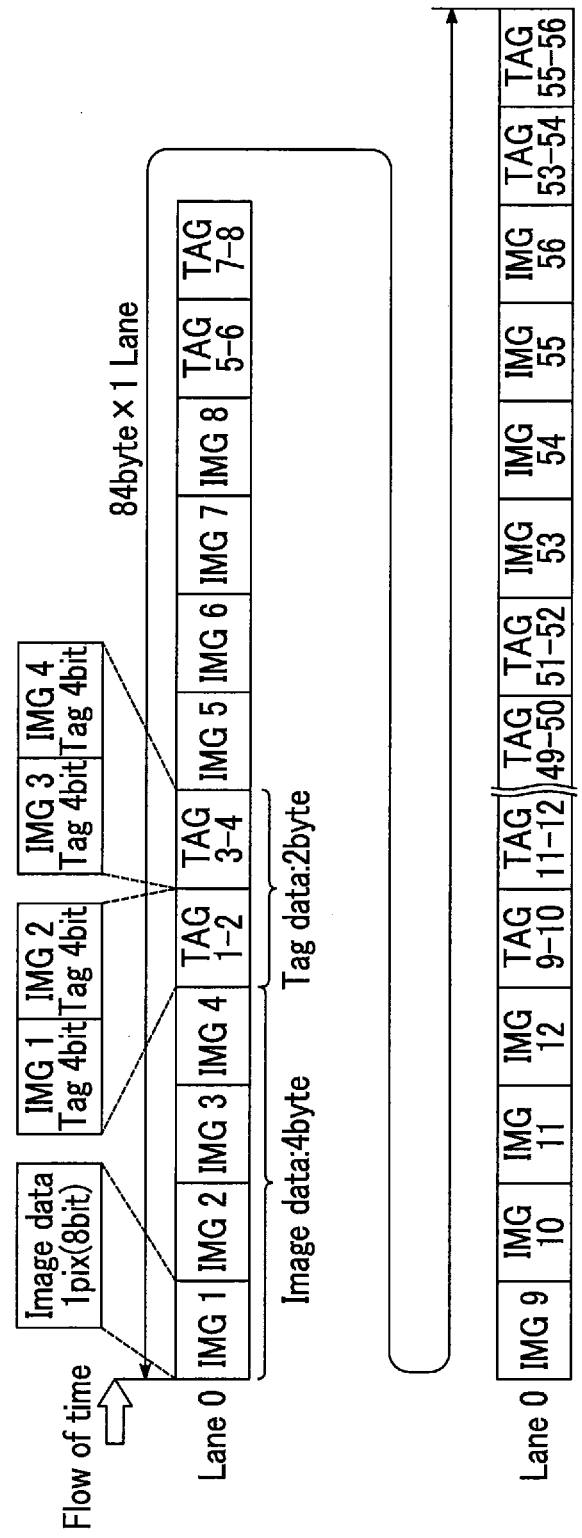
FIG. 3 is a diagram illustrating a format of a packet in a first mode.

FIG. 3 is a diagram illustrating a format of a packet in the first mode. Each of IMG1 to IMG4 indicates image information (8 bits) corresponding to one pixel in order from a leading part (left end) of the packet. TAG1-2 indicates additional information (4 bits) added to the image information IMG1 and additional information (4 bits) added to the image information IMG2. TAG3-4 indicates additional information (4 bits) added to the image information IMG3 and additional information (4 bits) added to the image information IMG4. As mentioned above, in the first mode, the packet generation portion 40 generates a packet having a payload of 84 bytes (14 sets corresponding to 56 pixels), and 1 set is formed by data of a total of 6 bytes including image information (a total of 4 bytes) corresponding to 4 pixels and additional information (a total of 2 bytes) added to the 4 pixels (first generation unit).

Figure 4:
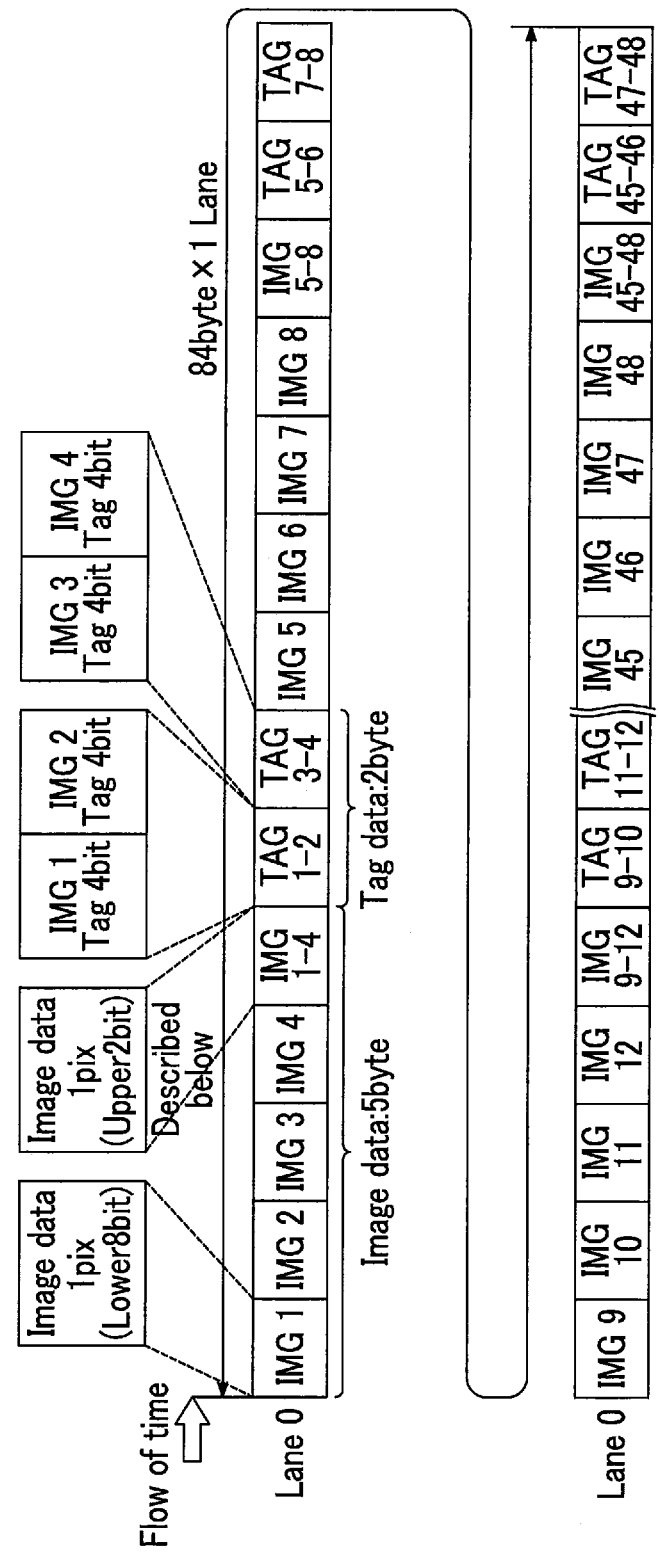
FIG. 4 is a diagram illustrating a format of a packet in a second mode.
Figure 5:
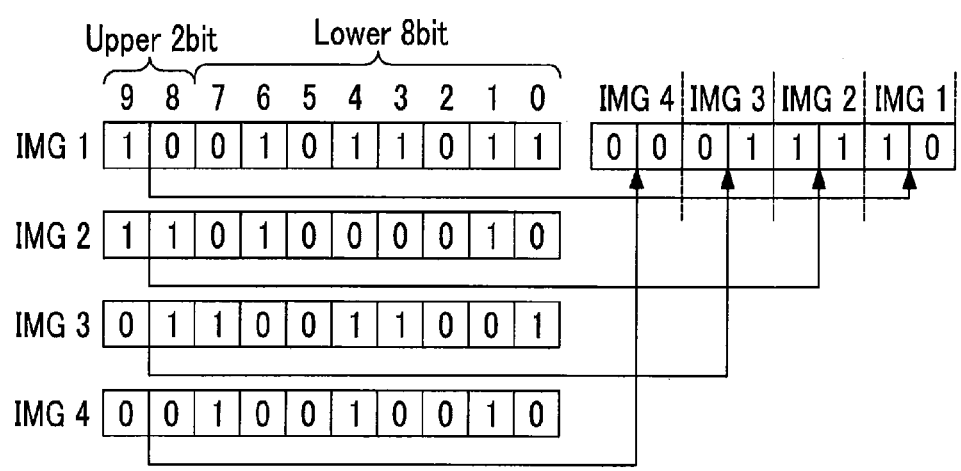
FIG. 5 is a diagram illustrating a configuration of IMG1-4.

FIG. 4 is a diagram illustrating a format of a packet in the second mode. Each of IMG1 to IMG4 indicates image information of lower 8 bits among image information (10 bits) corresponding to 1 pixel in order from a leading part (left end) of the packet. IMG1-4 indicates image information of upper 2 bits in the image information of pixels corresponding to the image information IMG1 to IMG4. FIG. 5 is a diagram illustrating a configuration of the image information IMG1-4. The image information IMG1-4 is generated by arranging image information pieces of upper 2 bits corresponding to the image information IMG1 to IMG4 in a defined order. In this example, the image information pieces of upper 2 bits are arranged in an order of the image information IMG4, IMG3, IMG2, and IMG1.

The description will be made referring to FIG. 4 again. TAG1-2 indicates additional information (4 bits) added to the image information IMG1 and additional information (4 bits) added to the image information IMG2. TAG3-4 indicates additional information (4 bits) added to the image information IMG3 and additional information (4 bits) added to the image information IMG4. As mentioned above, in the second mode, the packet generation portion 40 generates a packet having a payload of 84 bytes (12 sets corresponding to 48 pixels), and 1 set is formed by data of a total of 7 bytes including image information (a total of 4 bytes) of lower 8 bits corresponding to 4 pixels, image information (a total of 1 byte) of upper bits corresponding to the 4 pixels, and additional information (a total of 2 bytes) added to the 4 pixels (second generation unit).

In the present exemplary embodiment, a payload length is common to the first mode and the second mode. In the first mode, 1 set is formed by data of 6 bytes, and, in the second mode, 1 set is formed by data of 7 bytes. The least common multiple of 6 and 7 is 42, but, in the present exemplary embodiment, 84 bytes which is double of 42 is defined as a payload length. The reason is as follows.

Information such as Start of Packet (SOP), an address of a transmission destination of a packet, and an address of a transmission source thereof is appended to each packet. Since this information has a specific data amount regardless of a payload length, transmission is performed more efficiently as a payload length is increased. On the other hand, a 1-bit correction code is added to each packet, but if a payload length is increased too much, there is a high probability that 2-bit errors may occur. Therefore, a payload length is required to be defined in consideration of balance between transmission efficiency and a 2-bit error occurrence probability, and, as an example thereof, in the present exemplary embodiment, a payload length is defined as 84 bytes.

The packet generated by the packet generation portion 40 undergoes processes in the 8B/10B encoder 42 and the P/S converter 44 as described above, and is transmitted from the communication device 10A to the communication device 10B. Here, packet configuration information indicating a configuration of the packet which is transmitted from the communication device 10A, is transmitted to the communication device 10B. The packet configuration information is, for example, information for determining whether a packet is generated from 8-bit data or 10-bit data. The packet configuration information may be transmitted only once before a packet is transmitted, and may be included in each packet.

The transmitted packet undergoes processes in the S/P converter 52 and the 10B/8B decoder 54, so as to be output to the packet conversion portion 56.

The packet conversion portion 56 determines whether the received packet is generated from 8-bit data or 10-bit data based on the packet configuration information, and converts the packet into image information in accordance with a result of the determination. In other words, in a case where the packet is generated from 10-bit data, upper 2 bits and lower 8 bits of image information are extracted from the packet for each pixel, and are joined together so as to be converted into 10-bit image information. The converted image information is written to the image information buffer 34.

According to the present exemplary embodiment, data whose resolution is 10 bits is transmitted without reducing transmission efficiency by using a packet format of a fixed length (84 bytes) common to one used for transmission of data whose resolution is 8 bits.

Modification Examples

The exemplary embodiment may be modified as follows. In addition, plural modification examples may be combined with each other.

Modification Example 1

Although, in the above-described exemplary embodiment, an example of using a packet format common to data whose resolution is 8 bits and data whose resolution is 10 bits has been described, the exemplary embodiment of the invention may be applied to data with other resolutions. A function of the packet generation portion 40 is described as follows when the number of bits of data is generalized.

In the first mode, the packet generation portion 40 generates a packet having a b-byte payload including plural sets of first data corresponding to a pixels from the first data having m-bit image information and p-bit additional information for each pixel (first generation unit). In addition, in the second mode, the packet generation portion 40 generates a packet having a b-byte payload including plural sets of second data corresponding to a pixels from the second data having n-bit image information and p-bit additional information for each pixel (second generation unit). Here, $p<m<n$ is satisfied. In addition, a is defined so that $(n-m) \times a$ becomes multiples of 8. Further, b is defined based on the least common multiple of the number of bytes of sets of the first data corresponding to a pixels and the number of bytes of sets of the second data corresponding to a pixels.

The example described in the exemplary embodiment corresponds to a case of m=8, n=10, and p=4, and, in this case, a minimum value of a is 4. Then, since the number of bytes of sets of the first data corresponding to a pixels is 6 bytes, and the number of bytes of sets of the second data corresponding to a pixels is 7 bytes, the least common multiple thereof is 42.

As another example, for example, if m=8, n=12, and p=4, a becomes 2. Then, since the number of bytes of sets of the first data corresponding to a pixels is 3 bytes, and the number of bytes of sets of the second data corresponding to a pixels is 4 bytes, the least common multiple thereof is 12. As described in the exemplary embodiment, a payload length is defined from values of integer multiples of the least common multiple in consideration of transmission efficiency and a 2-bit error occurrence probability.

Modification Example 2

A function of the packet conversion portion 56 is described as follows when the number of bits of data is generalized. In the first mode, the packet conversion portion 56 converts a packet having a b-byte payload including plural sets of first data corresponding to a pixels into the first data having m-bit image information and p-bit additional information for each pixel. In addition, in the second mode, the packet conversion portion 56 converts a packet having a b-byte payload including plural sets of second data corresponding to a pixels into the second data having n-bit image information and p-bit additional information for each pixel. Here, $p<m<n$ is satisfied. In addition, a is defined so that $(n-m) \times a$ becomes multiples of 8. Further, b is defined based on the least common multiple of the number of bytes of sets of the first data corresponding to a pixels and the number of bytes of sets of the second data corresponding to a pixels.

Modification Example 3

The exemplary embodiment of the invention may be applied to a case where additional information is not added to image information. For example, if m=8, n=10, and p=0, and, in this case, a minimum value of a is 4. Then, since the number of bytes of sets of the first data corresponding to a pixels is 4 bytes, and the number of bytes of sets of the second data corresponding to a pixels is 5 bytes, the least common multiple thereof is 20.

Modification Example 4

In the exemplary embodiment, an example has been described in which 1 set is formed by image information corresponding to 4 pixels and additional information, but, in this case, the image information I/F 26 may write image information and additional information to the image information buffer 34 every 4 pixels.

Modification Example 5

In the exemplary embodiment, the data items are arranged in the packet as illustrated in FIGS. 3 to 5, but image information or additional information may be arbitrarily arranged in a set of data (corresponding to 4 pixels in the exemplary embodiment) as long as the arrangement is predefined.

Modification Example 6

The communication device 10 may be configured to realize the above-described function by the controller 20 executing a program, and the above-described function may be mounted in a hardware circuit. In addition, the program may be recorded on a computer readable recording medium such as an optical recording medium or a semiconductor memory so as to be provided, and the program may be read from the recording medium so as to be installed in the communication device 10. Further, the program may be provided via an electric communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A packet generation device comprising:
   a first generation unit that generates a packet having a b-byte payload including a plurality of sets of first data corresponding to a pixels from the first data having m-bit image information for each pixel; and
   a second generation unit that generates a packet having a b-byte payload including a plurality of sets of second data corresponding to a pixels from the second data having n-bit image information for each pixel (where m<n),
   wherein a is defined so that (n−m)×a becomes multiples of 8, and
   wherein b is defined based on a least common multiple of the number of bytes of sets of the first data corresponding to a pixels and the number of bytes of sets of the second data corresponding to a pixels.

2. The packet generation device according to claim 1,
   wherein the first generation unit generates a packet having a b-byte payload including the plurality of sets of first data corresponding to a pixels from the first data having m-bit image information and p-bit additional information for each pixel, and
   wherein the second generation unit generates a packet having a b-byte payload including the plurality of sets of second data corresponding to a pixels from the second data having n-bit image information and p-bit additional information for each pixel (where p<m<n).

3. A non-transitory computer readable medium storing a program causing a computer to function as:
   a first generation unit that generates a packet having a b-byte payload including a plurality of sets of first data corresponding to a pixels from the first data having m-bit image information for each pixel; and
   a second generation unit that generates a packet having a b-byte payload including a plurality of sets of second data corresponding to a pixels from the second data having n-bit image information for each pixel (where m<n),
   wherein a is defined so that (n−m)×a becomes multiples of 8, and
   wherein b is defined based on a least common multiple of the number of bytes of sets of the first data corresponding to a pixels and the number of bytes of sets of the second data corresponding to a pixels.

* * * * *